(No Model.)
M. ST. GERMAIN.
STALL FLOOR.
No. 490,931. Patented Jan. 31, 1893.
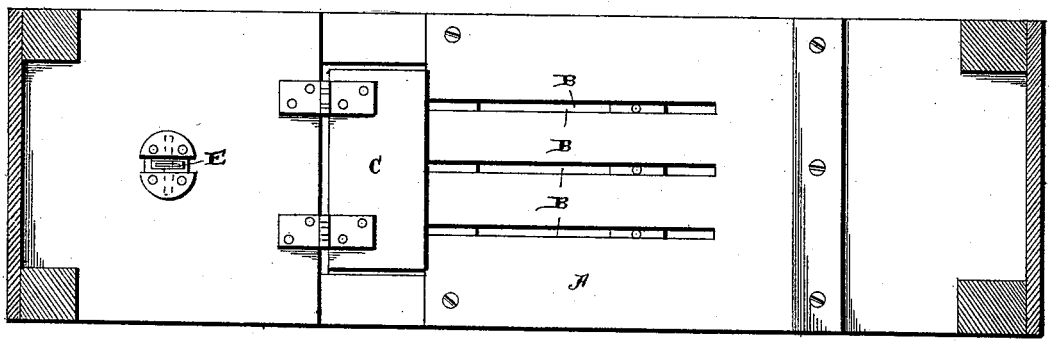
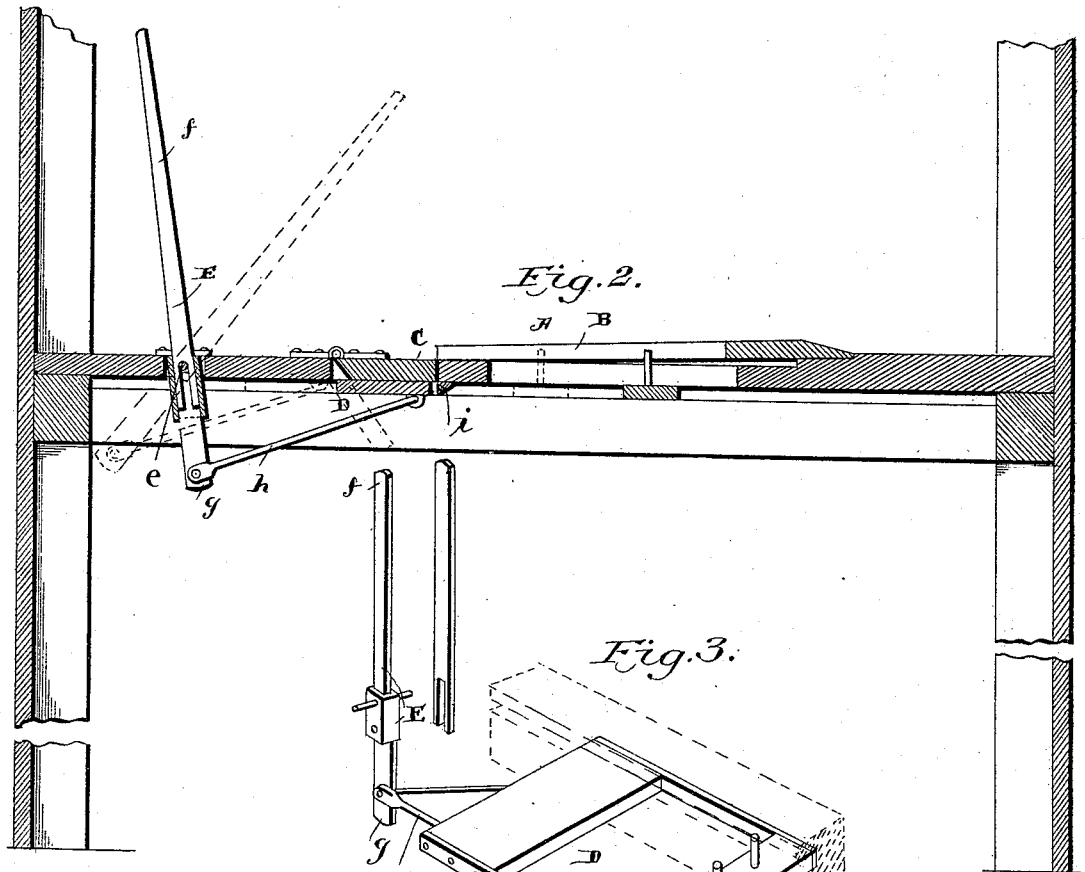
Witnesses
Geo. E. Fuch
Rob. J. Fitzgerald
Inventor
M. St Germain
per
C. E. Allen
Atty.

UNITED STATES PATENT OFFICE.

MARSHALL ST. GERMAIN, OF ST. ALBANS, VERMONT.

STALL-FLOOR.

SPECIFICATION forming part of Letters Patent No. 490,931, dated January 31, 1893.

Application filed October 29, 1892. Serial No. 450,360. (No model.)

*To all whom it may concern:*

Be it known that I, MARSHALL ST. GERMAIN, a citizen of the United States, residing at St. Albans, in the county of Franklin and State of Vermont, have invented certain new and useful Improvements in Stall-Floors; and I do hereby declare the following to be a full, clear, and exact description of the invention, such as will enable others skilled in the art to which it appertains to make and use the same.

My invention relates to improvements in stable floors, more especially designed for the use of horses and oxen, and the objects of my improvements, are, first,—to afford an immediate opportunity for the passage of the urine, through slits in the stall floors, where it is deposited directly in the vault below, and thereby avoid the absorption of the moisture by the floor-bedding; second,—to provide a ready and effective means for cleaning the urine slits, or escapes; third,—to furnish at the same time a convenient opening at the rear of the stall for the passage of the droppings of the animals directly into the cellar beneath; and fourth,—to operate the entire device by means of a detachable lever, thereby precluding liability to accident and economizing both in room and expense.

In the drawings, in which similar letters indicate like parts, Figure 1, is a plan view of my stable floor. Fig. 2, is a vertical longitudinal section of the same. Fig. 3, is a perspective view of the slide.

Through the stall floor represented by A, a suitable number of narrow slits or elongated openings B are cut, extending length-wise from the rear or outer end, part way through the stall.

C is a trap door in the barn floor immediately back of the stall floor A. It is so hinged at the rear that its forward side will drop as soon as its support or slide D, below is withdrawn. The length of this trap is limited by the distance between the floor-joists, which is generally nearly that of the width of the stall.

E is a lever which extends through the barn-floor back of the trap C, and is so pivoted at e, in a slot in the floor through which it passes, that as its upper end or handle f, is moved back and forth, in the direction length-wise of the stall, its lower extremity g, beneath the floor is moved correspondingly, thereby carrying the slide D, to which the end g is connected by the pivoted rods h. This slide D, is so arranged as to move horizontally upon recessed ways in the floor-joists, or on suitable supports attached thereto, and is designed to raise and thus close the trap C, when carried forward beneath it, and when the trap is thus closed, to provide for the trap a reliable support, the stop i, preventing it from being moved farther in that direction. By moving the slide D backward, by means of the lever E to which it is thus loosely attached, the trap door C being therefore deprived of its support, at once swings downward by its own weight, thus exposing an opening in the stable-floor through which all deposit upon it may be readily pushed or scraped off into the vault below.

Projecting forward of the slide D and attached thereto by connecting rods which move in the same recessed ways, is a truck on the end of which is a cross-bar F, provided with suitable teeth which are designed to project upward and into the narrow slits B in the stall-floor, for the purpose of cleaning and keeping them open, as they are moved back and forth with the slide D.

In order that the lever-handle f, may not be left in the way and to prevent the liability of moving the sliding device accidentally, as well as for the sake of economy and convenience, it is made detachable substantially in the manner shown, being constructed of wood or metal, and so arranged as to be easily inserted into a socket in the lower part of the lever g. When disconnected the possibility of opening the trap door through carelessness is removed.

The operation of my improved device will be readily apparent from the foregoing description.

While the additional facilities for the escape of the urine without being compelled to run down the length of the stall floor the arrangement of the slide and truck which serves both to clean the urine escapes and operate the trap door with the same movement, and the adjustable, detachable lever-handle all combined to constitute an improved stable floor, which by its saving of time, decreasing the labor and insuring perfect safety, render it a device useful, practical, simple and valuable.

What I claim and desire to secure by Letters Patent, is,—

1. The combination of the stall floor having an opening through it, the door for closing this opening, the slide placed under the floor and adapted to be moved back and forth in relation to the door, the connecting rods, and the lever for moving the slide, substantially as shown.

2. The combination of the stall floor having the slits B, and an opening to receive the door C, the slide D, F provided with projections to extend up into the slits, the conducting rods and lever, substantially as described.

3. The combination of the slide, the door C placed in an opening in the floor, the connecting rod, the lever $g$, the socket, and the handle having its lower end forked, so as to catch over the pin or rod $e$, substantially as set forth.

In testimony whereof I do affix my signature in presence of two witnesses.

MARSHALL ST. GERMAIN.

Witnesses:
ELMER E. DAVIS,
JOS. DANA ALLEN.